No. 881,553. PATENTED MAR. 10, 1908.
H. S. CORNISH.
MEANS FOR MEASURING AND MIXING LIQUIDS.
APPLICATION FILED NOV. 1, 1905.

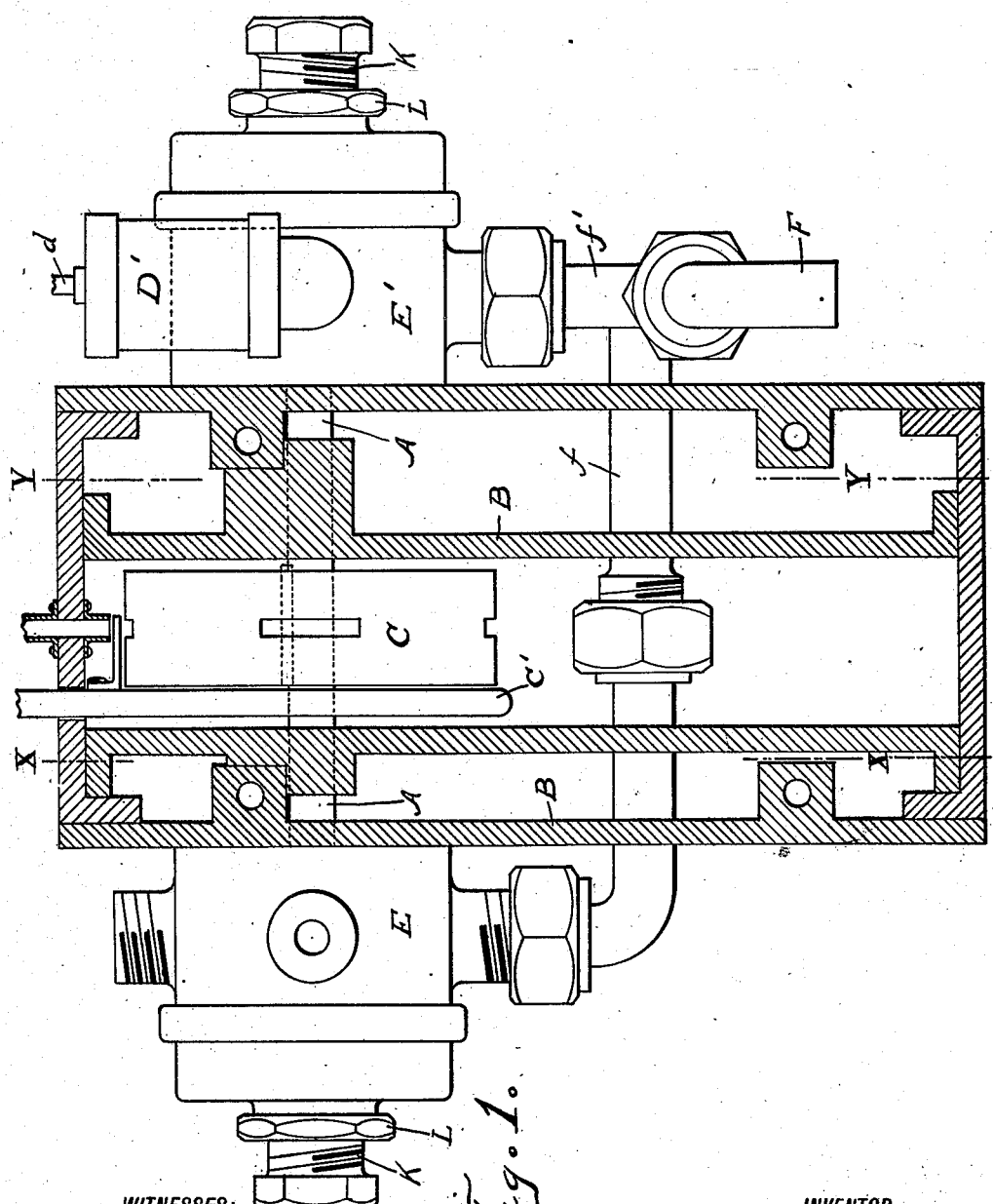

4 SHEETS—SHEET 2.

WITNESSES:

INVENTOR
Harry S. Cornish
BY
Townsend & Decker
ATTORNEYS

No. 881,553. PATENTED MAR. 10, 1908.
H. S. CORNISH.
MEANS FOR MEASURING AND MIXING LIQUIDS.
APPLICATION FILED NOV. 1, 1905.
4 SHEETS—SHEET 3.
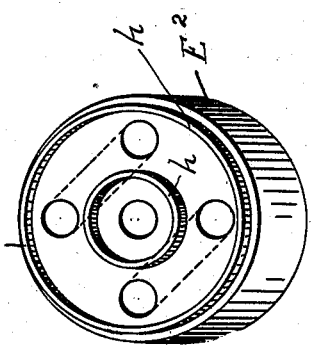
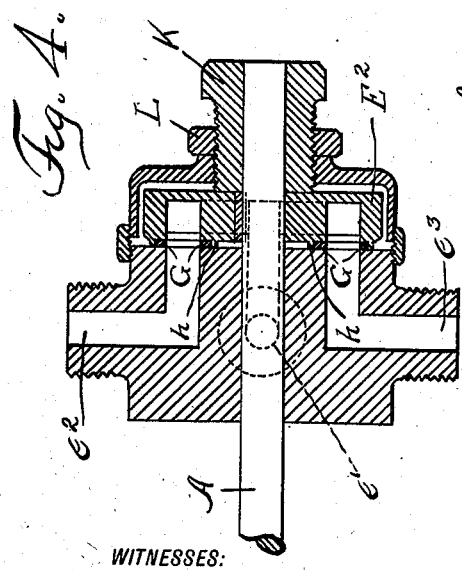
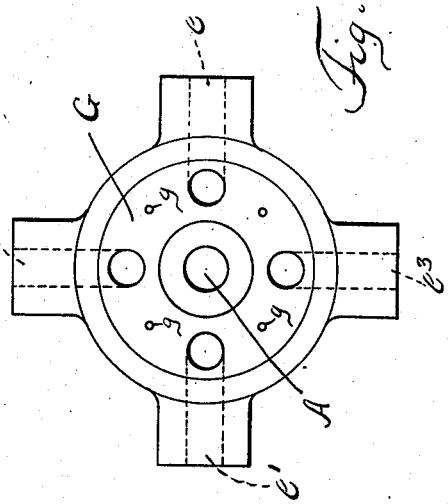
WITNESSES:
INVENTOR
Harry S. Cornish
BY
Townsend & Decker
ATTORNEYS.

No. 881,553. PATENTED MAR. 10, 1908.
H. S. CORNISH.
MEANS FOR MEASURING AND MIXING LIQUIDS.
APPLICATION FILED NOV. 1, 1905.

4 SHEETS—SHEET 4.

WITNESSES:

INVENTOR
Harry S. Cornish
BY
ATTORNEYS.

UNITED STATES PATENT OFFICE.

HARRY S. CORNISH, OF NEW YORK, N. Y., ASSIGNOR TO NEW YORK LIQUID DISPENSING MACHINE COMPANY, A CORPORATION OF NEW YORK.

MEANS FOR MEASURING AND MIXING LIQUIDS.

No. 881,553.     Specification of Letters Patent.     Patented March 10, 1908.

Application filed November 1, 1905. Serial No. 285,393.

*To all whom it may concern:*

Be it known that I, HARRY S. CORNISH, a citizen of the United States, and a resident of New York, in the county of New York and State of New York, with post-office address 118 West Forty-first street, have invented certain new and useful Improvements in Means for Measuring and Mixing Liquids, of which the following is a specification.

My invention relates to apparatus for automatically measuring, mixing and delivering a carbonated liquid such as water mixed with a flavoring liquid such as a flavoring syrup in determinate or measured proportions, and is especially designed for use in dispensing soda water, ginger ale and other drinks.

The object of my invention is to provide a simple, cheap and effective apparatus by means of which the two liquids making up the drink shall be delivered or dispensed in the desired fixed proportion without variation due to the tendency of the carbonating gas to accumulate in the measuring chambers or from differences in the viscosity of the flavoring syrup or liquid employed as one of the ingredients of the drink.

To this end, my invention consists in the combination of valves, piston measuring cylinder, and a pair of measuring cups for the flavoring liquid in which the various parts are combined in a manner hereafter more particularly described and claimed.

Figure 3:
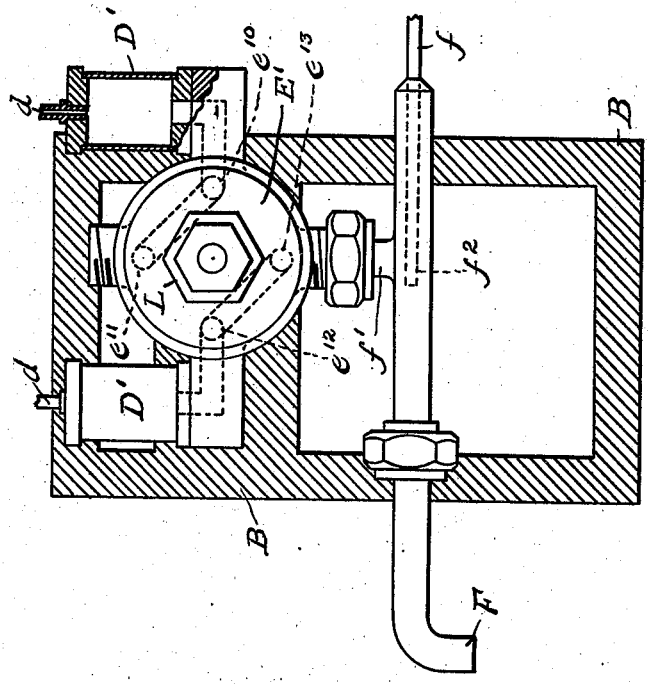
Figure 2:
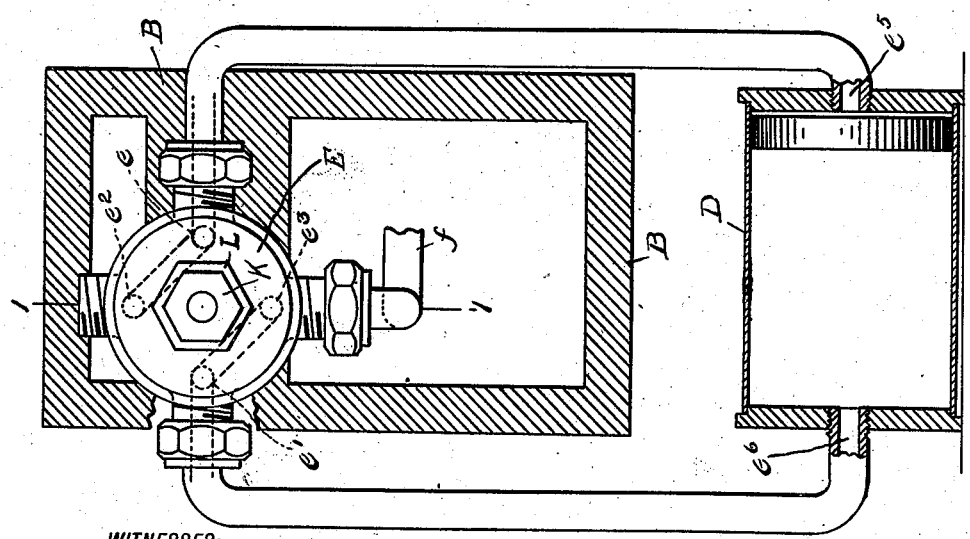
Figure 7:
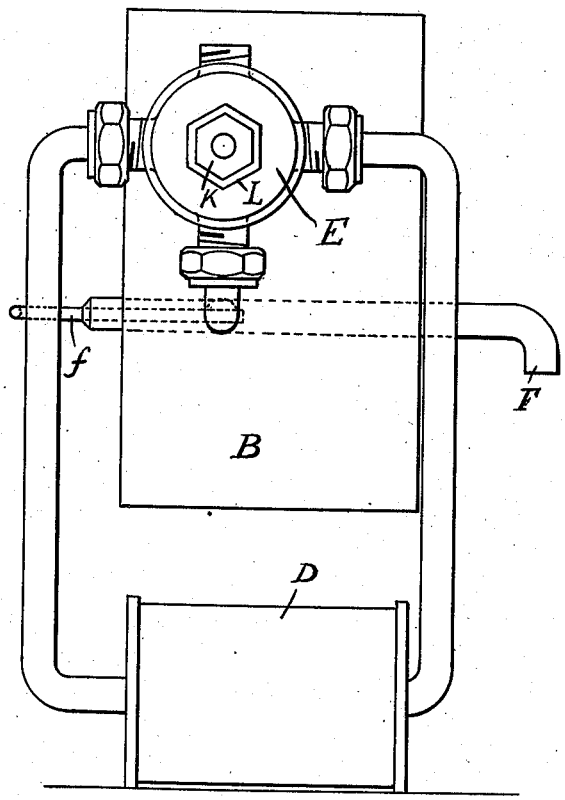

In the accompanying drawings, Figure 1 is a front elevation and partial vertical section through the supporting frame of so much of an apparatus embodying my invention as is necessary to disclose its manner of construction and operation. Fig. 2 is an end elevation of the apparatus on a reduced scale, the supporting frame being indicated in section on the line X X, Fig. 1 and illustrates that portion of the apparatus which contains the piston measuring cylinder here shown in section. Fig. 3 is a similar view from the other end and shows the measuring cups, a section of the frame being taken on the line Y, Y, Fig. 1, one of the measuring cups being shown in section. Fig. 4 is a vertical section through one of the two valves on the line 1, 1 of Fig. 2. Fig. 5 is a plan view showing the valve seat in the valve body. Fig. 6 is a perspective view of a disk valve. Fig. 7 is an end elevation of the apparatus looking at the piston measuring cylinder end.

A indicates the valve or faucet carrying shaft of the apparatus and B suitable framework upon which the parts are mounted. The manner and means of operating this shaft form no particular part of my invention, but I have, for the sake of illustration, shown a shaft as provided with a coupler C provided with slots adapted to receive the coin of proper size and to support the same in the path of a manually operated actuated device after the manner described in patent to J. P. Muth, dated June 14, 1904, No. 862,429.

The coin chute and opening through which the coin is delivered to the coupler are merely indicated. The manual operating device is typified by a loosely mounted lever C' mounted on shaft A and provided with a projection adapted to engage the coin, thereby coupling the lever and shaft A, as more particularly set forth in the patent above referred to.

The faucet may consist of two separate valve structures.

E, E' indicate the valve casings for the two separate valves which may be both mounted upon said shaft so as to be actuated together when the shaft is turned. The valves themselves may be constructed in any suitable way as, for instance, in the manner indicated in Figs. 4, 5 and 6. Each valve, preferably, comprises within the casing a disk $E^2$ seated on one face against a plane face of the valve body which latter is provided with suitable ports $e$, $e^1$, $e^2$, $e^3$, adapted to register with appropriate ports in the disk $E^2$, said latter ports being connected in the body of the disk by suitable passages as indicated by the dotted lines in the Figs. 2 and 3 and in Fig. 6. This construction provides a four-way valve whose connections may be reversed by a quarter turn.

The valve whose casing is indicated at E controls the connection between a suitable source of charged liquid such as carbonated water under pressure and the opposite ends of the measuring cylinder D which measures the carbonated liquid and contains a movable piston, and also the connections from the opposite ends of said cylinder to the discharge pipe leading to the dispensing nozzle.

The valve is properly constructed to establish a connection between the source of carbonated liquid and the opposite ends of the cylinder in alternation and also establishes connection alternately between said ends and the discharge pipe and nozzle.

Ports $e$, $e'$ of the valve connect respectively with the opposite ends of the cylinder D through ports $e^5$ and $e^6$ respectively. Port $e^2$ leads from the source of charged carbonated liquid and port $e^3$ connects by a pipe $f$ with the discharge or outlet pipe F into which leads also a pipe connected with a corresponding port of the valve whose casing is indicated at E'.

As already stated, the cylinder D is provided with a movable piston. The liquid passing into one end of said cylinder forces the piston to the opposite end thereof and when the piston stops the cylinder contains the desired measured quantity of liquid which obviously can be forced out of the cylinder by the application of pressure to the piston at the opposite side thereof.

By the operation of the valve controlling the connections of measuring cylinder D, the exact quantity of carbonated liquid required for a drink is measured by permitting the liquid to flow into one end of the cylinder D until the piston therein is forced to the opposite end of the cylinder. During such operation the connection between said opposite end of the cylinder and the discharge nozzle is open so that the liquid previously measured out into the cylinder by connection of the source of carbonated liquid with such opposite end is forced out into the discharge pipe. Upon turning the valve the connections are reversed and liquid is now measured into the end of the cylinder to which the piston has been forced as just described and moves said piston to the starting end, thereby forcing out the contained liquid measured therein to the discharge pipe, the connection of such end of the cylinder with the source of carbonated liquid being at such time cut off by the operation of the valves.

The action in detail would be as follows: The valve whose casing is indicated at E' has similar ports to those already described but its port[11] $e$ connects with a tank containing the flavoring syrup, while its ports $e^{10}$ and $e^{12}$ connect respectively with a pair of measuring cups D' having air vents $d$ and the operation of the valve places said cups alternately in connection with the syrup supply and alternately discharges them, the liquid measured in said cups being permitted to pass from the valve through pipe $f'$ to the discharge pipe F into which the carbonated liquid from measuring cylinder D is simultaneously delivered under pressure by way of an ejector nozzle $f^2$ arranged as shown at or near the point of discharge of pipe $f'$ into pipe F so as to operate by an "ejector" process to exhaust or forcibly pull the flavoring syrup or liquid from that one of the measuring cups being discharged, and at the same time produce a thorough mixture of the syrup and carbonated liquid. The end of pipe $f$, Fig. 2, is reduced as shown in Fig. 3 to form this nozzle. During such discharge of one measuring cup, its connection is cut off from the source of syrup supply and the other cup, being connected with such source, is filling. It then becomes possible to draw two drinks immediately in succession without waiting for the refilling of a cup which has been discharged as after one cup has been emptied the valve is operated to draw another drink and the ports connect with the other cup which was filling while the first one was emptying, the passages between the source of syrup supply and the measuring cups obviously being of sufficient size so that one measuring cup will fill in the length of time the other takes to empty.

Assuming that the apparatus is employed for dispensing ginger ale, the one valve would have its port $e^2$ connected with the tank of carbonated water and the other would have a similar port connected with a tank of ginger ale syrup. The combined contents of measuring device D and one measuring cup D' exactly equals the amount of ginger ale required for one drink. The two valves being in position shown in Figs. 2 and 3 respectively, the carbonated liquid will flow through port $e^2$ to one end of the cylinder D and the syrup will flow to the right hand cup D' while at the same time the carbonated liquid will flow from the opposite end of the cylinder D through port $e'$ and from the left hand measuring cup D' to the outlet pipe $f'$. The carbonated liquid passing the nozzle $f^2$ will aid in drawing off the syrup from the left hand cup D', which syrup drops down just behind the end of the nozzle $f^2$ and is sucked along not all at once but gradually so that the combined liquids are discharged into the drinking glass in mixed condition. By this operation of the valve, the ports have been brought to register in a manner to measure the appropriate amount of syrup in the other measuring cup D' and of carbonated liquid in the opposite end of the cylinder D and such quantities are ready for simultaneous discharge by the next operation of the valve mixed in their measured proportions.

In order to avoid the necessity of stuffing boxes around the shaft A and to make it possible to employ any desired number of valves on the same shaft, I prefer to employ the manner of packing the valve illustrated in detail in Figs. 4, 5 and 6 in which G indicates a ring or disk of leather or other suitable material mounted on that face of the valve body or casing against which the face of valve disk E² presses. Said ring G may be held in place by appropriate pins g and is of course perforated at points coincident with the ports in the valve body. The valve disk E² is provided with annular metal ridges h, which are concentric with one another and engage the ring G on annular lines within and without the circle embracing the valve ports. To seat each disk firmly, an adjusting sleeve K may be employed for each, said sleeve being threaded to engage a screw thread in the head of the casing and being arranged to engage the outside face of the disk and being held by a lock nut L. The annular ridges on the valve disk press firmly against the leather or other washer and produce a liquid-tight joint which prevents escape of the liquid in an improper way from one port to another or from the ports to the central shaft A, which, therefore, requires no packing.

The shaft A passes freely through the valve body as indicated, but the disk E² is held against rotation on the shaft by a suitable spline which will permit the longitudinal adjustment of the disk for the purpose of taking up wear and insuring a good liquid-tight joint at the packing ring G. The pins g prevent the turning of the ring G upon the seat.

By the use of my apparatus, I not only secure the discharge of a fixed or unvariable amount of carbonated liquid owing to the fact that the quantity measured is determined exactly by the cubic capacity of the measuring cylinder no matter how long the interval between the operations of the valve shaft, but I also make it possible to draw one drink immediately after the other with the desired or required amount of flavoring syrup, thus securing at all times an exact proportion of the liquids which go to make up the drink.

I am aware that it has been before proposed to employ faucets for carbonated beverages in which provision is made for delivering a carbonated liquid and flavoring syrup in mixed condition, but in some of such previous forms of apparatus, the carbonated liquid has been measured by allowing it to flow into a receiver closed at one end and then to discharge therefrom through the inlet passage so that there is an opportunity for the collection of gas at the top of the receiver and the quantity measured off will vary.

In other forms of apparatus the syrup is measured in a measuring cup and is delivered together with an unmeasured quantity of the carbonated liquid through the delivery spout. In the latter form of apparatus but one measuring cup is used for each desired syrup and the construction is such that the measuring of a fresh quantity cannot begin until the previously measured quantity has been completely drawn off. My improved apparatus differs from such previous constructions as hereinbefore set forth and secures an unvarying proportion of the two liquids, while at the same time permitting drinks to be dispensed in immediate succession.

What I claim as my invention is:

1. In an apparatus for measuring, mixing and delivering mixed drinks, the combination of a piston-measuring cylinder for the carbonated liquid, a valve shaft, a valve operated thereby and adapted to connect the opposite ends of the piston-measuring cylinder in alternation with the supply source of carbonated liquid and with the discharge pipe, a pair of measuring cups and a second valve operated by said shaft and adapted to connect said cups in alternation to a source of supply of flavoring syrup and to the discharge pipe simultaneously with the alternate operations of the first named valve, as and for the purpose described.

2. In an apparatus for measuring, mixing and delivering a carbonating liquid and a flavoring syrup, the combination of a shaft, two four-way valves mounted thereon, a piston measuring cylinder, a discharge pipe, valve ports and connections for connecting the opposite ends of said cylinder alternately with an inlet pipe leading from the source of supply and with the discharge pipe, a pair of measuring cups for measuring the syrup, and ports and connections of the second valve adapted to connect said measuring cups alternately with the inlet supply pipe and with the discharge pipe simultaneously with the connections established for the measuring cylinder, all as described so that a fixed quantity of carbonated liquid will be measured and one of the measuring cups will be permitted to fill simultaneously with the forcing out from the measuring cylinder of the previously measured contents thereof, together with the syrup simultaneously discharged from the other cup.

3. In an apparatus for dispensing mixed drinks, the combination of two valves, a common shaft for the same, a measuring device for one of said valves consisting of a cylinder and piston, a pair of measuring cups for the other valve, a common discharge pipe into which the contents of the cylinder are delivered by the action of the appropriate valve, and an ejector nozzle opening into said discharge pipe and leading from the outlet of the measuring cups, as and for the purpose described.

4. In an apparatus for dispensing a mixed drink, the combination of two or more sources of liquid supply, a source of liquid supply under pressure, a common discharge pipe, an ejector nozzle connected with the source of liquid supply under pressure and arranged in the discharge pipe to draw all the liquid from the other source and at the same time mix the two liquids together in said discharge pipe, and means for admitting liquid from said liquid supply under pressure to the pipe leading to said nozzle during the flow of the liquid from the other source.

5. In an apparatus for measuring, mixing and delivering mixed drinks, the combination of two sets of measuring devices for the two liquids respectively, one consisting of a piston measuring cylinder and the other of a pair of measuring cups and a pair of valves having ports and connections adapted, as described, one to connect the opposite ends of said cylinder alternately with an inlet pipe leading from the source of supply and with a discharge pipe and the other adapted to connect said measuring cups alternately with their source of supply and with the discharge pipe simultaneously with the connections established for the measuring cylinder all as described so that a fixed quantity of one liquid will be measured in the cylinder and one of the measuring cups will be permitted to fill with the other liquid simultaneously with the forcing out from the measuring cup of the previously measured contents thereof and the simultaneous discharge of the liquid from the other cup.

6. In an apparatus for measuring, mixing and delivering mixed drinks, the combination of a piston-measuring cylinder for the carbonated liquid, a faucet having valve ports and connections adapted to connect the opposite ends of the piston-measuring cylinder in alternation with the supply source of carbonated liquid and with the discharge pipe, a pair of measuring cups and valve ports and connections adapted to connect said cups in alternation to a source of supply of flavoring syrup and to the discharge pipe simultaneously with the alternate connections of the measuring cylinder.

Signed at New York in the county of New York and State of New York this 12th day of October A. D. 1905.

HARRY S. CORNISH.

Witnesses:
C. F. TISCHNER Jr.,
LILLIAN BLOND.